United States Patent
Decker et al.

(10) Patent No.: US 12,361,565 B2
(45) Date of Patent: Jul. 15, 2025

(54) METHOD FOR IMPROVING MARKERLESS MOTION ANALYSIS

(71) Applicant: GOLFTEC Enterprises, LLC, Englewood, CO (US)

(72) Inventors: Michael Decker, Parker, CO (US); Craig Simons, Boulder, CO (US)

(73) Assignee: GOLFTEC Enterprises, LLC, Englewood, CO (US)

( * ) Notice: Subject to any disclaimer, the term of this patent is extended or adjusted under 35 U.S.C. 154(b) by 386 days.

(21) Appl. No.: 17/674,717

(22) Filed: Feb. 17, 2022

(65) Prior Publication Data

US 2022/0262013 A1    Aug. 18, 2022

Related U.S. Application Data

(60) Provisional application No. 63/150,511, filed on Feb. 17, 2021.

(51) Int. Cl.
*G06T 7/246* (2017.01)

(52) U.S. Cl.
CPC .... *G06T 7/246* (2017.01); *G06T 2207/20081* (2013.01); *G06T 2207/20084* (2013.01); *G06T 2207/30196* (2013.01)

(58) Field of Classification Search
CPC ........... G06T 7/246; G06T 2207/20081; G06T 2207/20084; G06T 2207/30196; G06T 2207/10016; G06T 7/20
See application file for complete search history.

(56) References Cited

U.S. PATENT DOCUMENTS

| | | | |
|---|---|---|---|
| 2014/0198948 A1* | 7/2014 | Sigal | G06V 40/23 382/103 |
| 2019/0247650 A1* | 8/2019 | Tran | A61N 1/3704 |
| 2021/0059565 A1* | 3/2021 | Morris | G06T 7/0012 |
| 2022/0108468 A1 | 4/2022 | Nakamura et al. | |

FOREIGN PATENT DOCUMENTS

| | | |
|---|---|---|
| CA | 3136732 A1 | 10/2020 |
| JP | 2012526334 A | 2/2014 |
| JP | 2020042476 A | 3/2020 |

(Continued)

OTHER PUBLICATIONS

Mehta et al, ("VNect: Real-time 3D Human Pose Estimation with a Single RGB Camera", ACM TOG (SIGGRAPH 2017, May 3, 2017) (Year: 2017).*

(Continued)

*Primary Examiner* — Amara Abdi
(74) *Attorney, Agent, or Firm* — Haynes and Boone, LLP

(57) ABSTRACT

Systems, methods, and computer-readable storage devices are disclosed for improving markerless motion analysis. One method including: receiving position data of joint centers of a body in motion captured by at least one camera; enhancing, using model equations, three-dimensional (3D) angular kinematic data of the position data of the joint centers of the body, wherein the enhanced 3D angular kinematic data includes increased measurement accuracy of the position data of the joint centers of the body; and providing the enhanced 3d angular kinematic data for display to evaluate motion performance.

20 Claims, 7 Drawing Sheets

(56) References Cited

FOREIGN PATENT DOCUMENTS

| JP | 2020195431 A | 12/2020 |
|----|----|----|
| WO | 2021046583 A1 | 3/2021 |
| WO | WO2022178165 A1 | 8/2022 |

OTHER PUBLICATIONS

Corazza et al, (Markerless Motion Capture through Visual Hull, Articulated ICP and Subject Specific Model Generation, Int J Comput Vis (2010) 87: 156-169) (Year: 2010).*
Rosenhahn et al, ("Markerless Motion Capture of Man-Machine Interaction", IEEE 2008) (Year: 2008).*
Office Action dated Nov. 7, 2023 relating to Australian patent application 2022224605.
Office Action mailed on Sep. 3, 2024 in parallel Japanese patent application No. 2023-550167 (5 pages).
Office Action mailed on Nov. 26, 2024 in parallel Canadian patent application No. 3208840 (4 pages).
Mehta et al., "VNect: real-time 3D human pose estimation with a single RGB camera", ACM Transactions on Graphics (TOG), vol. 36, Issue 4, Article No. 44, pp. 1-14, Jul. 20, 2017 (Jul. 20, 2017) [retrieved on Nov. 25, 2024 (Nov. 25, 2024) from: https://dl.acm.org/doi/abs/10.1145/3072959.3073596, also available at: https://arxiv.org/pdf/1705.01583 ].
Notice of Allowance mailed on Mar. 12, 2025 in parallel New Zealand patent application No. 802903 (3 pages).

\* cited by examiner

METHOD FOR IMPROVING MARKERLESS MOTION ANALYSIS

CROSS-REFERENCE TO RELATED APPLICATIONS

This application claims priority to U.S. Provisional Patent Application No. 63/150,511, filed Feb. 17, 2021, for Method for Improving Markerless Motion Analyses, the subject matter of the application is incorporated in this application by reference.

TECHNICAL FIELD

The invention relates generally to a method, system, and computer-readable medium for providing physical motion training and instruction through the use of markerless motion analyses. More particularly, the invention relates to a computer-implemented system for providing improved markerless motion analyses for athletic training and instruction.

INTRODUCTION

Many different techniques have been implemented in order to teach proper mechanics of motion for a sport, for example, swinging a golf club or a bat. Currently, instructors, such as, for example, golf professionals, use an imaging and/or video analysis system to teach how to properly swing a golf club. Using a typical video or imaging analysis system, a golf swing is captured by an imaging device, such as a camera and/or a video-recording device. The instructor replays the recorded image and/or video information to illustrate the golf swing while providing feedback regarding the swing. Instructional feedback may be comments relative to problems associated with the swing, compliments regarding improvement in the swing, suggestions on correcting the swing, and/or any other verbal instructional comments in context with the swing. Visualizing a personal golf swing in this manner has been recognized as a valuable tool in identifying problems as well as correcting those problems in order to improve the overall golf swing.

Although imaging and/or video analysis systems are widely used by sports professionals, such as professional golf players, baseball players, etc., these systems have particular drawbacks. One particular drawback relates to the fact that these systems need to identify human pose and spatial landmarks. For example, a professional must subjectively analyze the image and/or video information to identify human pose and spatial landmarks. However, typical images and video alone may not capture enough information given different camera angles, too few cameras, loose clothing, etc. Therefore, professionals may be forced to guess human pose and spatial landmarks information. Accordingly, the human pose and spatial landmarks information identified by professionals alone may be inaccurate since it is difficult to isolate mechanics and measurements of the swing on image and/or video.

In order to overcome the drawbacks associated with typical imaging and/or video analysis systems, motion analysis systems may require a user to wear markers and/or sensor elements on their body and the markers and/or sensor elements transmit positional data of isolated body parts, such as hands, hips, shoulders, and head. The isolated points on the body are measured during a swing in accordance with an absolute reference system, e.g., a Cartesian coordinate system wherein the center point is a fixed point in the room. By using motion analysis, exact measurements can be provided to determine problems more accurately in a swing.

Drawbacks to such marker-based imaging and/or video systems is that they require a user to wear markers and the camera and/or video equipment may be required to be accurately placed. Thus, development of markerless motion capture systems/methods has been motivated by a wide range of athletic and clinical applications.

However, limitations in using markerless motion capture to achieve three-dimensional/tri-axial (3D) rotational motions (angular kinematics) persist due to a limited set of spatial coordinates provided by standard markerless motion capture methods. It is with respect to these and other considerations that the present application has been made.

SUMMARY OF THE DISCLOSURE

According to certain embodiments, systems, methods, and computer-readable media are disclosed for improving markerless motion analysis.

According to certain embodiments, computer-implemented methods for improving markerless motion analysis. One method includes: receiving position data of joint centers of a body in motion captured by at least one camera; enhancing, using model equations, three-dimensional (3D) angular kinematic data of the position data of the joint centers of the body, wherein the enhanced 3D angular kinematic data includes increased measurement accuracy of the position data of the joint centers of the body; and providing the enhanced 3d angular kinematic data for display to evaluate motion performance.

According to certain embodiments, systems for improving markerless motion analysis are disclosed. One system including: a data storage device that stores instructions for improving markerless motion analysis; and a processor configured to execute the instructions to perform a method including: receiving position data of joint centers of a body in motion captured by at least one camera; enhancing, using model equations, three-dimensional (3D) angular kinematic data of the position data of the joint centers of the body, wherein the enhanced 3D angular kinematic data includes increased measurement accuracy of the position data of the joint centers of the body; and providing the enhanced 3d angular kinematic data for display to evaluate motion performance.

According to certain embodiments, non-transitory computer-readable media are disclosed that store instructions that, when executed by a computer, cause the computer to perform a method for improving markerless motion analysis. One method of the computer-readable media including: receiving position data of joint centers of a body in motion captured by at least one camera; enhancing, using model equations, three-dimensional (3D) angular kinematic data of the position data of the joint centers of the body, wherein the enhanced 3D angular kinematic data includes increased measurement accuracy of the position data of the joint centers of the body; and providing the enhanced 3d angular kinematic data for display to evaluate motion performance.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
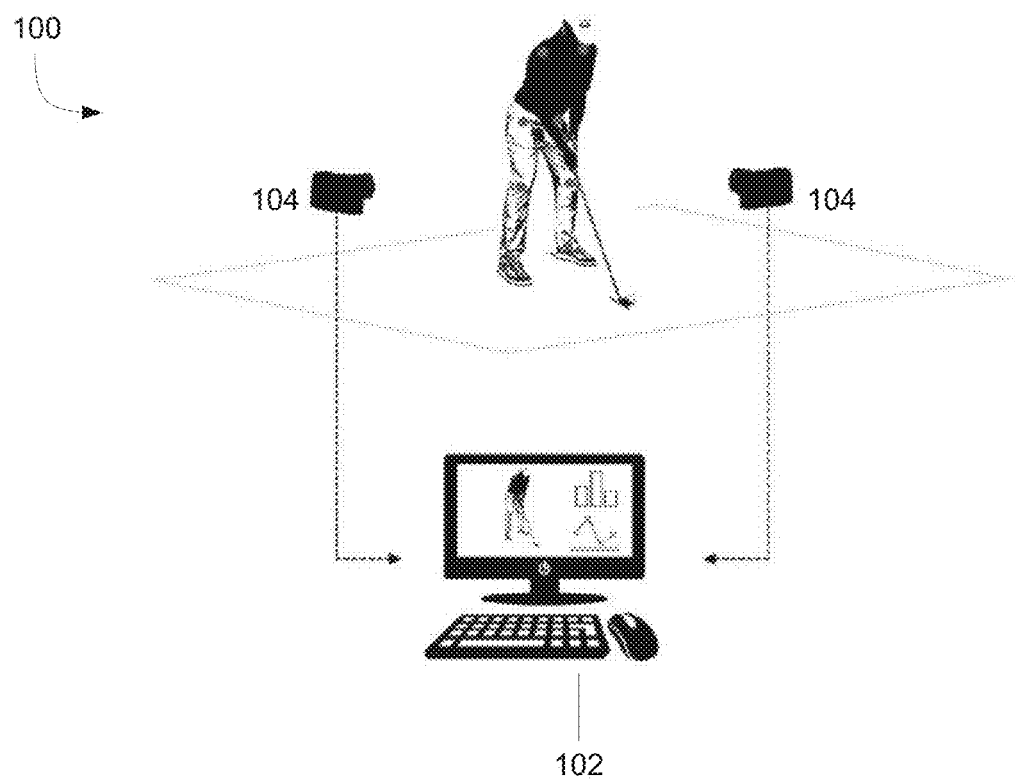
FIG. 1 illustrates the performance of a golf swing as an example of an embodiment and best mode of implementation for the proposed methods of performing markerless motion analysis, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a method to estimate three-dimensional spatial segmental orientation of more than one segment when one or more segments are insufficiently defined using available spatial reference point data.

Referring now to the drawings, FIG. 1 depicts an environment 100 for conducting enhanced motion analyses according to embodiments of the present disclosure. As shown in FIG. 1, the environment 100 includes an imaging and/or video analysis system 102 that uses one or more cameras and/or video recording equipment 104 to record a physical motion processes information captured by the camera and/or video recording equipment 104. The imaging and/or video analysis system 102 may also capture and/or calculate positional information. The imaging and/or video analysis system 102 processes the data in order to generate analysis, or teaching information, which may be used for golf swing analysis and training.

Although the environment 100 is described below as a system and method for providing golf swing analysis, the imaging and/or video analysis system 102 may be used to provide motion analysis in other sports, such as baseball, tennis, cricket, polo, or any other sports where a motion is a measure through which an element of the sport is conducted. Moreover, the analysis might be similarly used to provide almost any form of physical motion analysis. Further, while the environment 100 depicts two cameras 104, a single camera or a single video recording equipment may be used.

In embodiments of the present disclosure, measurement accuracy may be of importance, and accurate motion capture has been improved via development of image processing algorithms and body models that simulate anatomical constraints to enhance the detection, tracking, and spatial transformation of skeletal segments and joint centers across sequential digital images. Development of markerless motion capture systems have a wide range of athletic and clinical applications, and optical systems are employed to identify human pose and spatial landmarks.

However, limitations of markerless motion capture to achieve three-dimensional/tri-axial rotational motions (angular kinematics) may persist due to a limited set of spatial coordinates provided by markerless motion capture methods. Complex multibody kinematics (as is demonstrated by human movement) may be achieved by two or more segments, mechanically constrained at joints that allow 3D rotation between adjacent segments. Following from Hilbert's foundational geometric incidence axioms, three non-collinear points allow for a plane to be defined in 3D-space (Euclidean). This condition enables an analytically defined coordinate system, which can create a body-fixed reference frame for segmental orientation measurement. When spatial coordinates of three body-fixed, non-collinear points per segment are not available, alternative approaches may be used to approximate 3D measurement.

For example, a partial set of 3D angular kinematics may be provided during movement tasks that are slowly performed in a particular 2D plane of motion, such as squatting or walking. Despite these motion capture limitations, large angular deviations may be demonstrated when compared to the concurrent measurements determined from a marker-based motion analysis system. As mentioned above, marker-based motion analysis systems directly affix markers on bony prominences with established and validated reliability for minimizing displacement from anatomical landmarks during dynamic activities.

However, identifying landmark points (key points) in markerless systems may rely on probabilistic, non-deterministic feature detection that may be highly sensitive to environmental conditions (lighting, obstructions/clothing, pose), which may create random position error where reported landmark coordinates are randomly displaced from true landmark locations. When attempting to use these points to define planar (2D) reference frames for kinematic measurement, random position error variance occurring at each key point may introduce compounding error between frames in a sequence of images. In addition, key point position error may propagate through analytically defined reference geometry in each frame, producing erroneous deviations. Further to the factors that directly affect key point position error, key point-derived reference frame error may be influenced by segment geometry and key point location on the segment with potential to actors with magnitude the reference frame to using markerless key points and can be compounded/magnified. In view of the potential errors, various methods discussed below may be used to reduce the impact to position errors.

Methods may be employed to measure 2D angular kinematics referenced from the 3D coordinates of three, non-adjacent joint center locations (i.e., hip, shoulder, elbow, etc.) that have yielded patterns of motion with relatively good agreement between markerless and marker-based systems. Similar motion patterns accompanied with the persistence of large angular deviations have prompted surrogate measurements of rotational motion to create valid performance measurements using markerless motion capture. Further, combining musculoskeletal body models with imposed anatomical constraints have improved measurement accuracy of angular kinematics.

However, despite these approaches, transverse plane rotational motion where body segments twist away from a camera's 2D plane-of-view may rarely be extracted and reported. Although a larger set of cameras may improve the likelihood of markerless motion capture systems to adequately track 3D joint center locations during twisting movement tasks, transverse plane angular motion may be difficult to extract accurately and reliably.

A limitation of markerless motion capture technology may be the number of body-referenced, spatial coordinates that are available to measure 3D angular kinematics. As discussed in more detail below, measurements may require a body segment to have three reference points to define a local 3D coordinate system. 3D spatial orientation of one body segment to another body segment is physically quantified as the relative rotational difference between two, 3D coordinate systems. Measuring the 3D spatial orientation of a body segment (rigid-body) requires that 3D coordinate systems be defined for the rigid-body of interest relative to a global 3D coordinate system (reference frame). To define a 3D body fixed reference frame, spatial coordinates of at least 3 independent, non-colinear points fixed within a reference frame must be known. This geometric requirement may not be met by markerless motion capture, and thus, may prevent analytical methods from quantifying 3D spatial orientations with insufficient/underdetermined body segment coordinate data.

In order to improve upon markerless motion capture technology, embodiments of the present disclosure implement new analytical methods for measuring 3D angular kinematics from under-constrained physical systems, which may be a useful tool in analyzing twisting motions for performance (i.e., golf swing) and injury risk (i.e., knee injuries). Increasing a number of cameras used in markerless motion capture may improve accuracy of body referenced coordinates, but increased cameras may be unlikely to advance the computational requirements for providing valid and reliable 3D angular kinematic measurements. Hence, approaches that advance the utility of markerless motion capture technology are discussed in detail below.

The present disclosure relates to methods for providing and improving 3D motion analyses using markerless motion capture technology having at least one camera, such as, a single camera. Embodiments of the present disclosure provide ways for estimating 3D spatial orientation of one or more rigid bodies when fewer than three body-fixed reference points for each segment are known, and/or when those points are not rigidly fixed to the body, which may occur because of unexplained/random measurement variance.

In embodiments of the present disclosure, methods are provided that enable estimating of 3D spatial orientation of one or more rigid bodies through: (1) use of available spatial information, such as, but not limited to, two or more points on at least two directly or indirectly kinematically-constrained segments to achieve dependent segment reference frames that make use of an additional constraint that complements detail provided by directly observable body-fixed points; and (2) application of a probabilistic mapping of geometric relation between one or more body-fixed points and one or more systematic kinematic constraints, to a 3D body fixed reference frame. The process may make use of direct measurements from kinematically-constrained body-fixed coordinate systems to achieve an indirect representation of the multibody system kinematics. While the measurements track dependent reference frames, the measurements reflect a net effect of constrained multibody system kinematics. In other words, it may be considered the kinematic constraint centroid that functions as the third, body-fixed point shared by both segments. As such, a representative sample of kinematically constrained measurements may be paired with the corresponding validated reference measurement for any diagnostically meaningful motion to determine a weighted feature mapping that relates the two sets of measurements. The approach may include, but is it not limited to, supervised learning, latent variable models, and features derived from the constrained kinematics and/or key points.

Figure 2:
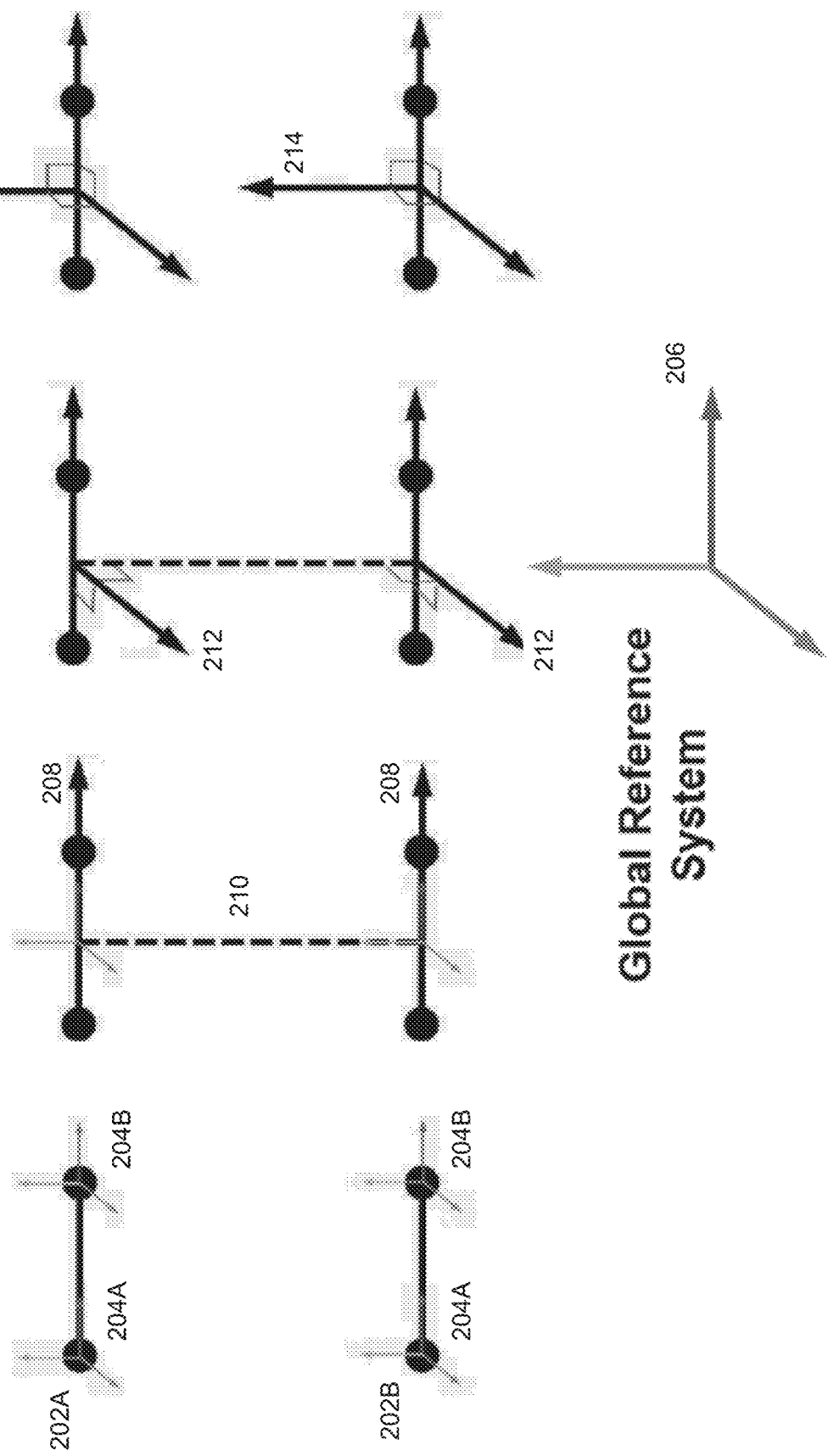
FIGS. 2A-2D illustrate a method for deriving body segment coordinate systems to compute 3D angular kinematics from a limited set of body referenced coordinates, according to embodiments of the present disclosure.

In accordance with an embodiment, as discussed in more detail below, a computational method is applied when at least two body-fixed points (key points) are known on at least two kinematically constrained rigid bodies (segments) and a global reference frame is defined. FIGS. 2A-2D depict a method for deriving body segment coordinate systems to compute 3D angular kinematics from a limited set of body referenced coordinates in accordance with the aspects of the present disclosure. In particular, FIGS. 2A-2D depict a method of defining body segment coordinate systems to enable the computation of three-dimensional (3D) angular kinematics when at least two body-fixed points are known on at least two kinematically constrained rigid bodies. As shown in FIG. 2A, segments 202A and 202B, each have at least two body-fixed points (key points) 204A and 204B. Each key points 204A and 204B may be based on a reference coordinate system 206 fixed in an inertial frame (global reference frame). For each of FIG. 2A-2D, reference axes are defined. FIG. 2B illustrates an axis 208 as being defined between the two body-fixed points 204A and 204B on each body-segment 202A and 202B. The body-fixed points 204A and 204B may not include the joint constraint shared by the two segments 202A and 202B. A temporary axis 210 may be defined from mid-points of each of axes 208 on (indirectly) adjacent segments 202A and 202B. FIG. 2C illustrates axes 212 may be defined as an axis orthogonal to a segment specific axis 208 and axis 210. FIG. 2D illustrates final axes 214 may be defined as an axis orthogonal to axes 208 and 212. This approach provides a reference frame on each segment such that one axis (axis 208) is body-fixed, and two axes capture an orientation-driven interaction representing the systematic, constrained joint kinematics between the two segments.

Measurements captured from the body axis-fixed reference frames provide a systematic representation that includes the (constrained) relative spatial orientation between the segments and each segment with respect to the global reference frame 206. As discussed in more detail below, 3D angular kinematics may then be calculated directly according to a convention that may be applied assuming independent, body-fixed coordinate systems.

For example, an x-axis and a z-axis may be defined as being parallel to the floor/ground and perpendicular to each other, and a y-axis may be defined as perpendicular to the x-axis and z-axis and orthogonal to the floor/ground. Alternatively, reference to coordinate origins may be defined to be unique to a user of the system. Using an axis system, measurements may be determined for angular rotation values. For example, $\Phi_s$ may represent a rotational angle of the shoulders around the x-axis, $\Theta_s$ may represent a rotational angle of the shoulders around the y-axis, $\zeta_s$ may represent a rotational angle of the shoulders around the z-axis, $\Phi_h$ may represent a rotational angle of the hips around the x-axis, $\Theta_h$ may represent a rotational angle of the hips around the y-axis, and $\zeta_h$ may represent a rotational angle of the hips around the z-axis. Accordingly, $\Phi$ relates to shoulder and hip bend, $\Theta$ relates to shoulder and hip rotation, and relates to shoulder and hip tilt. Measured with reference to a coordinate system, positional elements related to bend, rotation, and tilt of both the shoulders and the hips may be determined.

As mentioned above, embodiments of the present disclosure provide a supervised learning approach and/or a machine learning approach which may be used to enhance kinematic data. The approach of embodiments of the present disclosure may be based on training one or more machine learning approaches to determine a model equation used to enhance kinematic data. While machine learning is discussed more generally, one example of machine learning may include neural networks including, but not limited to, convolutional neural networks, deep neural networks, recurrent neural network, etc.

A kinematic enhancement procedure, as discussed in more detail below, may approximate the true, analytically defined, independent body-fixed reference frame orientations with respect to a global reference frame for a particular movement task. The procedure may use a probabilistic mapping that is determined using representative example measurements from the kinematically constrained validated examples of the independent segment orientations in relation to measurements calculated using the alternative body-axis fixed interacting reference frames during a representative sample of relative orientations. Model equations from the mapping procedure may then be used to measure 3D angular kinematics of a new movement performance. The results of which may be displayed on, for example, a dashboard of a computer screen, smart device, etc.

Figure 3:
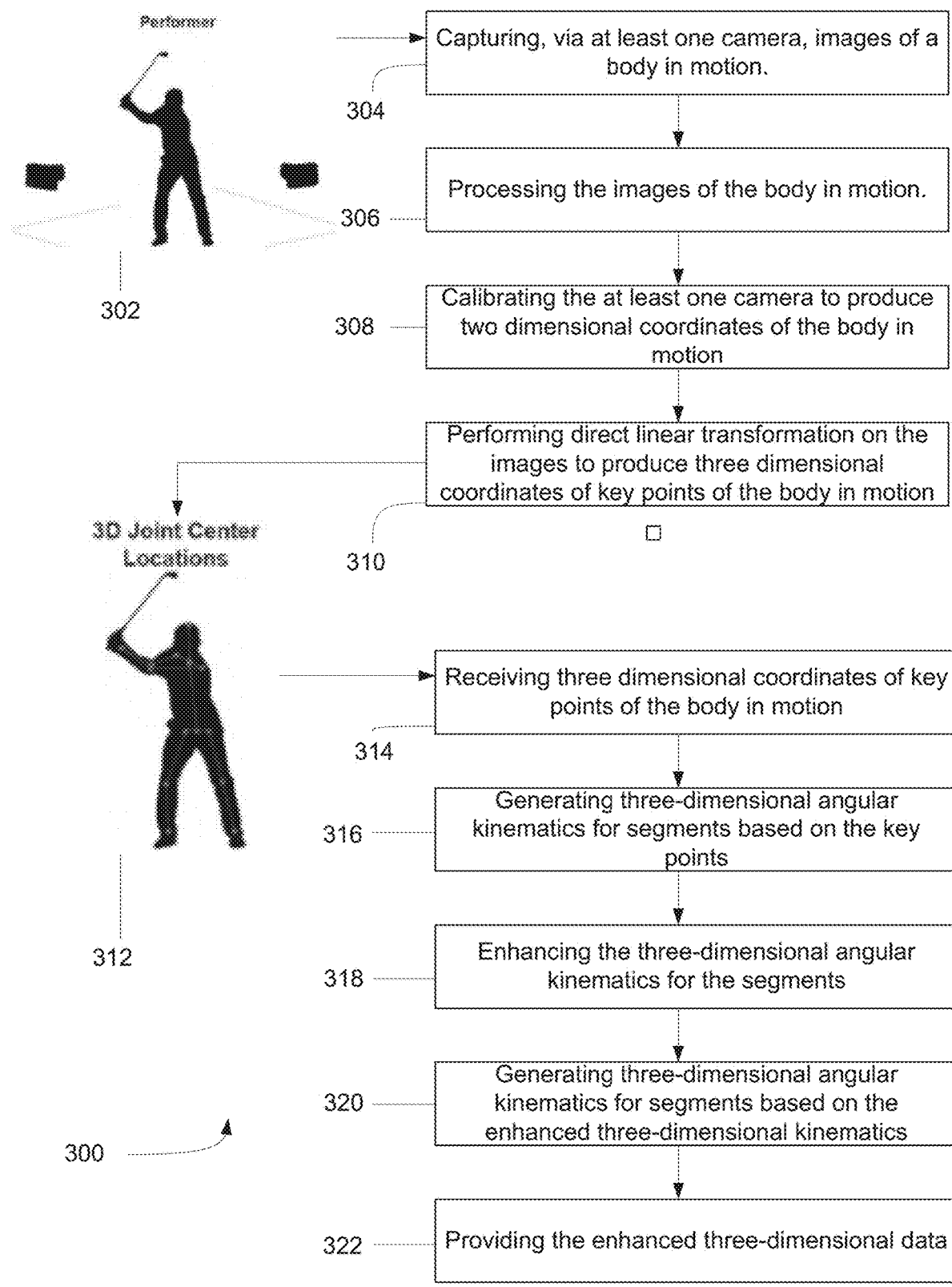
FIG. 3 illustrates a process for providing accurate 3D angular measurements using markerless motion capture, according to embodiments of the present disclosure.

FIG. 3 illustrates a method 300 for providing accurate 3D angular measurements using markerless motion capture in accordance with embodiments of the present disclosure. As shown in FIG. 3, an athlete/user/performer may perform an action 302 including motion of the body of the athlete/user/performer. At least one camera, for example, a single camera may capture at least two images of the body in motion at 304. At 306, image processing may be performed to output images having a two-dimensional array of pixels. Then, at 308, camera calibration may be performed to produce two dimensional coordinates of the body in motion. Next, as 310, direct linear transformation may be performed on the images to produce three dimensional coordinates of key points of the body in motion. For example, the three-dimensional coordinates of the key points of the body in motion may be three-dimensional joint center locations 312.

The three-dimensional joint center locations of the body in motion may be received at 314. As shown at 316 of FIG. 3, 3D angular kinematics may then be calculated directly according to a convention that would be applied assuming independent, body-fixed coordinate systems. At 318, a kinematic enhancement procedure that approximates the true, analytically defined, independent body-fixed reference frame orientations with respect to the global reference frame may be performed for a particular movement task captured by the at least one camera. As discussed in more detail below, the procedure may use a probabilistic mapping that is determined using representative example measurements from the kinematically constrained validated examples of the independent segment orientations in relation to the measurements calculated using the alternative body-axis fixed interacting reference frames during a representative sample of relative orientations. Model equations from the mapping procedure may then be used to measure the 3D angular kinematics of a new movement performance at 320, and may be displayed on a dashboard of a computer screen or smart device at 322.

Figure 4:
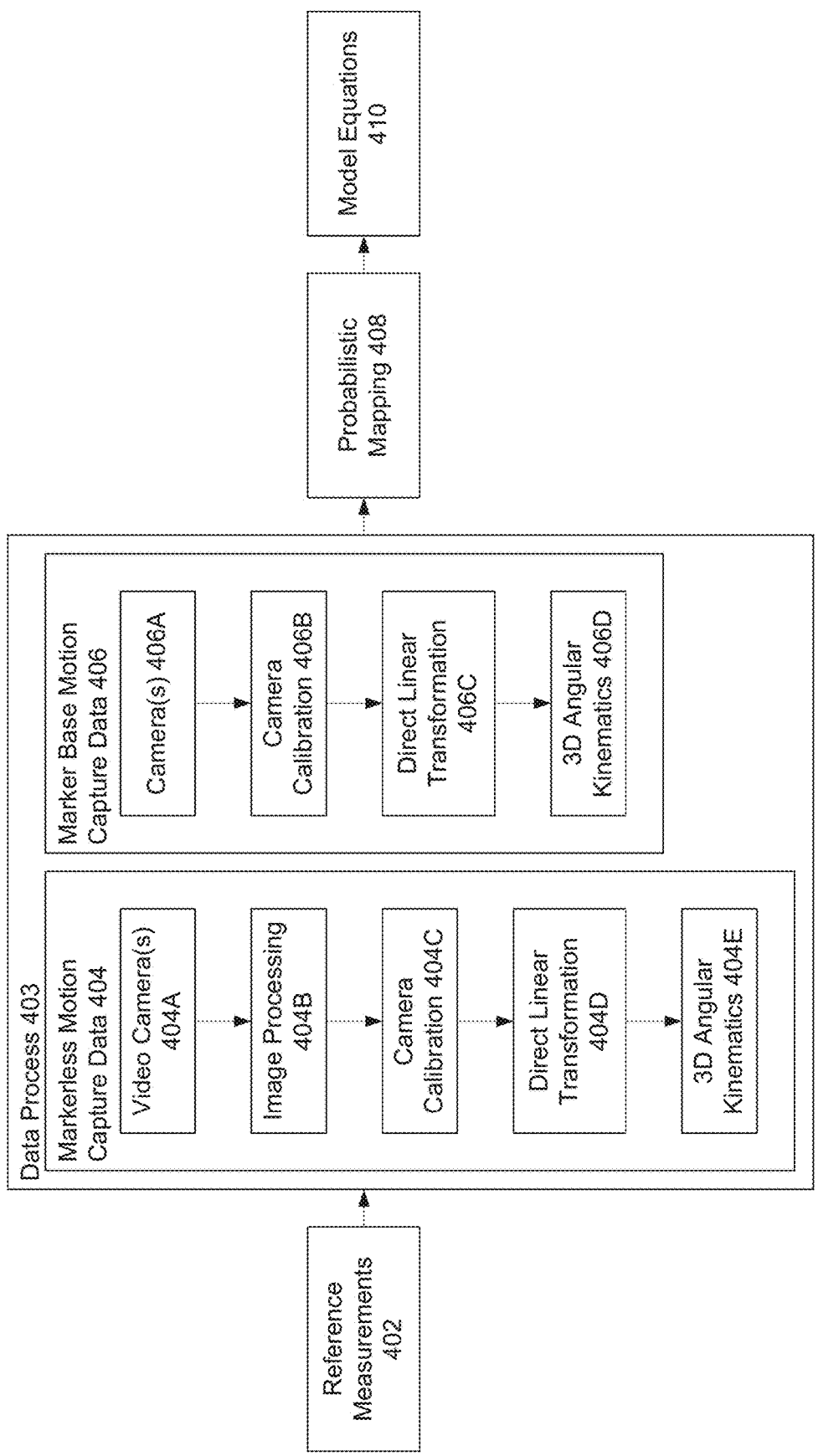
FIG. 4 illustrates a kinematic enhancement method for improving the accuracy of 3D angular measurements using markerless motion capture, according to embodiments of the present disclosure.

FIG. 4 illustrates a kinematic enhancement method for improving the accuracy of 3D angular measurements using markerless motion capture in accordance with the embodiments of the present disclosure. The procedure may begin at 402 in which reference measurements may be received/obtained by a data process 403. A probabilistic mapping may be used, and which is determined using representative example measurements from kinematically constrained validated examples of independent segment orientations in relation to the measurements calculated using the alternative body-axis fixed interacting reference frames during a representative sample of relative orientations.

For example, the data process 403 may process markerless motion capture data 404 that is used in the training of the one or more machine learning approaches. In the representative example measurements of markerless motion capture 404, an athlete/user/performer may perform an action including motion of the body of the athlete/user/performer. At least one camera, for example, a single camera may capture at least two images of the body in motion at 404A. At 404B, image processing may be performed to output images having a two-dimensional array of pixels. Then, at 404C, camera calibration may be performed to produce two dimensional coordinates of the body in motion. Next, as 404D, direct linear transformation may be performed on the images to produce three dimensional coordinates of key points of the body in motion. Then as shown at 404E, 3D angular kinematics may then be calculated directly according to a convention that would be applied assuming independent, body-fixed coordinate systems. The 3D angular kinematics be applied to produce rotational data regarding the three-dimensional coordinates.

Additionally, the data process 403 may process marker-based motion capture data 406 that is used in the training of the one or more machine learning approaches. For example, in marker-based motion capture, one or more infrared cameras 406A may capture markers that have been placed on user. Through the use of camera calibration 406B, x axis and y axis coordinates may be extracted from the captured markers. From the extracted coordinates, a direct linear transformation 406C may be used to produce a three-dimensional coordinate on an x, y, and z axis. Finally, three-dimensional angular kinematics 406D may be applied to produce rotational data regarding the three-dimensional coordinates.

In embodiments of the present disclosure, the data process 403 may employ a motion analysis method may extract and transform a set of body referenced landmarks (key points) from sequential video images of a movement performance. The set of key points may be limited and may provide some of the body's joint center locations, such as midpoint locations between pairs of key points. The key points may be received and/or input to produce three-dimensional angular kinematics. Thereafter, probabilistic mapping 408 may be used. During probabilistic mapping may use the representative example measurements from the kinematically constrained validated examples of independent segment orientations in relation to the measurements calculated using the alternative body-axis fixed interacting reference frames during a representative sample of relative orientations. The probabilistic mapping transformation 408 may provide model equations 410 to augment the computational accuracy of the 3D angular kinematics.

The enhanced kinematic data may then pass to a dashboard where relevant task-specific metrics are extracted and displayed numerically and/or graphically on the computer screen or smart device. (See, 320 and 322 of FIG. 3). The performance metrics may be used to evaluate movement performance and provide actionable insights. The probabilistic mapping may establish the relation between the coupled, under-constrained reference frames and the analytically defined equivalent reference frames. As discussed above, this is achieved by using paired, validated examples of the independent segment orientations in relation to the measurements calculated using the alternative body-axis fixed interacting reference frames during a representative sample of relative orientations. Such mapping provides for improved quantitative accuracy of measuring 3D angular kinematics from a set of under-constrained/defined body fixed reference locations, and advances markerless motion technology by providing a motion analysis method that is not limited by a small set of body referenced landmarks to produce accurate 3D angular kinematics.

The training of the probabilistic mapping may be performed on a plurality of example datasets to account for variability between measured subjects and/or different measurement setups. Additionally, there may be several repositories of the plurality of example datasets for a variety of sports and functional tasks. These repositories may be previously generated and freely available. Through the use of these plurality of example datasets, a limited set of key points that are captured by a single camera during markerless motion capture may be used to generate enhanced 3D angular kinematic data.

By training on the plurality of example datasets, the probabilistic mapping may learn common features across the example datasets. Probabilistic mapping may parameterize a relation between correlated phenomena when an analytic solution is not available. Probabilistic mapping make use of paired data related to an input and an output of some mechanism of interest. Approaches to apply probabilistic mapping may include numerical approximation or other function approximating methods applied with an error metric that probabilistically constrains the outcome based on likelihood.

Supervised learning is one application of probabilistic mapping. For example, supervised learning may use an analytical solution to determine position data based on a plurality of factors/data points from example datasets. Using examples of paired input-output data representing parameters and positions, a function may be approximated that maps position data to 3D angular kinematic data by minimizing the error of the predictions on the example data. As mentioned above, embodiments of the present disclosure may be used to produce a model equation using a supervised learning, machine learning, neural networks, etc.

More generally, the present disclosure may be used to improve various aspects of markerless motion capture through the use of, for example, supervised learning or machine learning, such as a neural network. In exemplary embodiments of the present disclosure, reference measurements used by a neural network trained may produce model equations. Accordingly, a neural network may be fed values. Then, the neural network may be trained to directly output model equations. In order to train a neural network, the neural network may receive, as input data, the markerless motion capture data 404 and the marker-based motion capture data 406.

Figure 5:
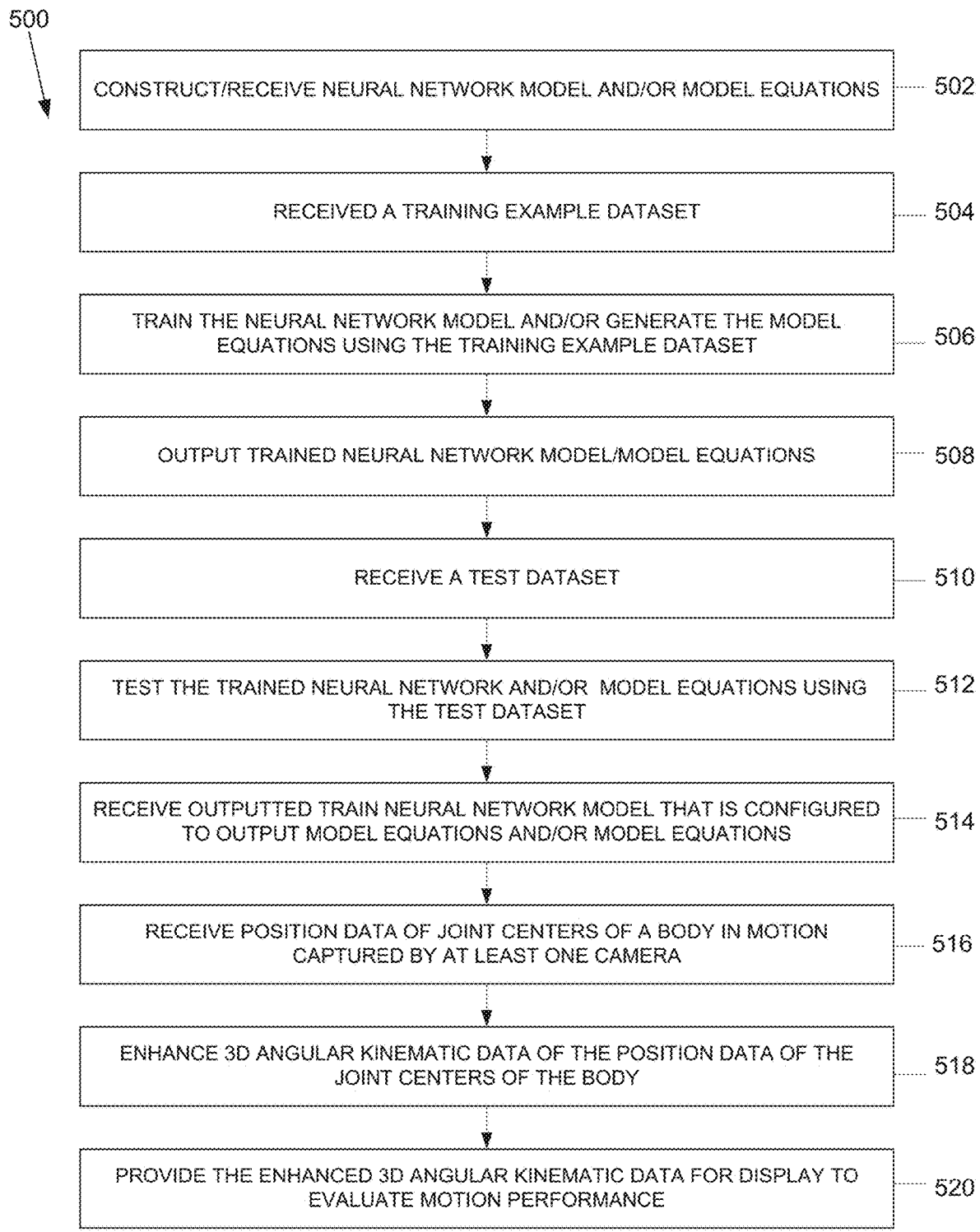
FIG. 5 depicts a method for improving markerless motion analysis, according to embodiments of the present disclosure.

FIG. 5 depicts a method 500 for improving markerless motion analysis, according to embodiments of the present disclosure. Method 500 may begin at step 502, in which a neural network model may be constructed, neural network may be received, and/or model equations may be directly received. The neural network model may include a plurality of neurons. The neural network model may be configured to output model equations. The plurality of neurons may be arranged in a plurality of layers, including at least one hidden layer, and may be connected by connections. Each connection including a weight. The neural network model may comprise a convolutional neural network model, deep neural network, recurrent neural network.

If a neural network is received/constructed or supervised learning is used to generate model equations, at step 504, a training example dataset may be received. The training example dataset may include position data of joint centers of a body in motion. By training on the example dataset, probabilistic mapping may learn common features across the example dataset. Probabilistic mapping may parameterize a relation between correlated phenomena when an analytic solution is not available. Probabilistic mapping make use of paired data related to an input and an output of some mechanism of interest. Further, the received training dataset may include data that has been previously captured by markerless motion capture systems and/or marker-based motion capture systems.

At step 506, the neural network model may be trained, or the model equations may be generated using the training example dataset. Then, at step 508, the trained neural network model/model equations may be outputted. At step 510, a test dataset may be received. Alternatively, and/or additionally, a test dataset may be created. Then, step 512, the trained neural network or outputted model equations may then be tested for evaluation using the test dataset. Further, once evaluated to pass a predetermined threshold, the trained neural network or outputted model equation may be utilized. Additionally, in certain embodiments of the present disclosure, the step of method 500 may be repeated to produce a plurality of model equations. The plurality of model equations may then be compared to each other. Alternatively, steps 510 and 512 may be omitted.

The outputted train neural network model that is configured to output model equations and/or model equations may be received at step 514. Then, at step 516, position data of joint centers of a body in motion captured by at least one camera may be received. For example, the at least one camera may be a single camera that captures images using markerless motion capture. Alternative, prior to receiving the position data, the single camera may be used to capture a first image and a second image of the body in motion at a first time and a second time different from the first time. Then, the position data of joint centers of a body in motion may be generated from the images. For example, receiving position data of the joint centers of the body may include receiving, for at least two separate points in time, at least two key points of a first segment of a body in motion and at least two key points of a second segment of the body in motion. The key points corresponding to a position of a part of the body in motion captured by at least one camera. From the receive position data, a first axis between the at least two key points of each segment may be defined, a temporary axis mid-points of each of first axes may be defined, a second axis for each segment, orthogonal to the temporary axis and the respective first axis of each segment, may be defined, and a third axis for each segment orthogonal to the first axes and the second axes may be defined. Then, 3D angular kinematics for the first segment and the second segment may be generated based the at least two key points of the first segment, the at least two key points of the second segment from the at least two separate points in time and based on the defined first, second, and third axes of the key points.

3D angular kinematic data of the position data of the joint centers of the body may then be enhanced at step 518. Enhancing 3D angular kinematic data may be enhanced using the model equations. As mentioned above, the model equations may be generated based on a probabilistic mapping to enhance the 3D angular kinematic data. The enhanced 3D angular kinematic data includes increased measurement accuracy of the position data of the joint centers of the body. Finally, the enhanced 3d angular kinematic data may be provided for display to evaluate motion performance at 520.

Figure 6:
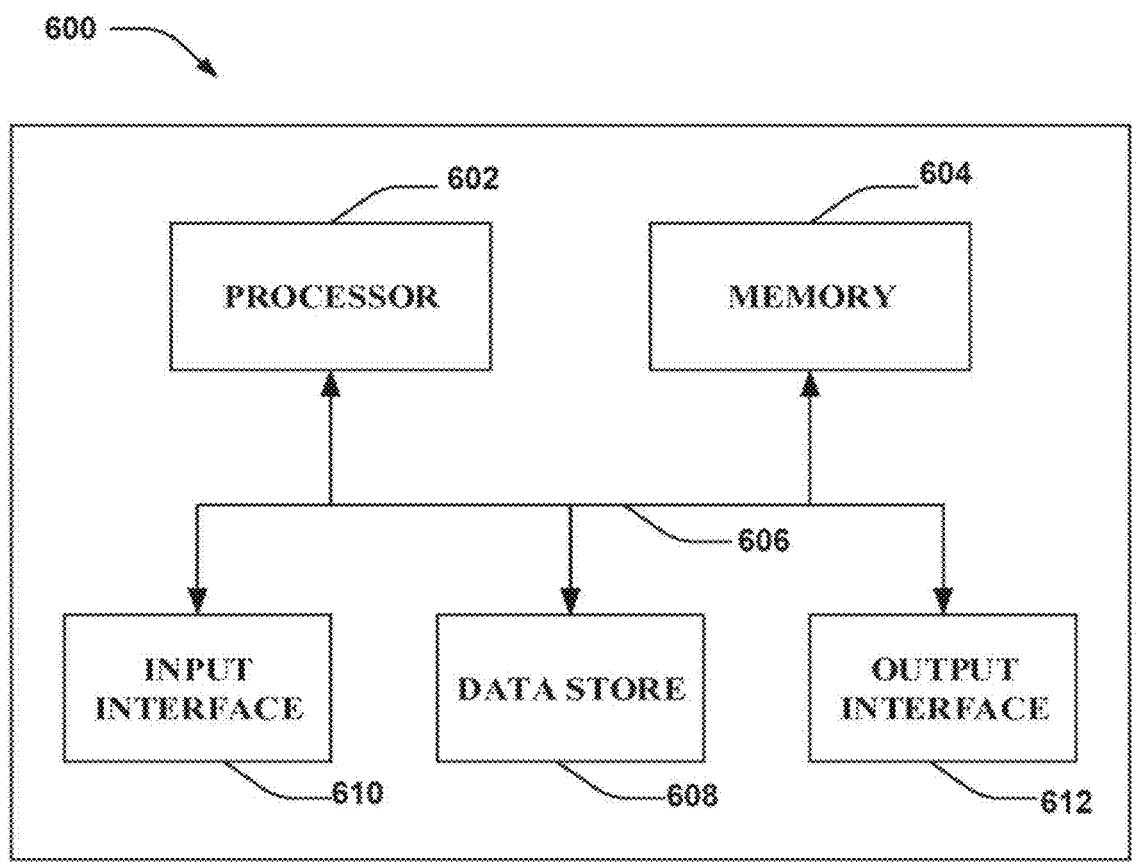
FIG. 6 depicts a high-level illustration of an exemplary computing device that may be used in accordance with the systems, methods, and computer-readable media disclosed herein, according to embodiments of the present disclosure.

FIG. 6 depicts a high-level illustration of an exemplary computing device 600 that may be used in accordance with the systems, methods, and computer-readable media disclosed herein, according to embodiments of the present disclosure. For example, the computing device 600 may be used in a system that performs methods, according to embodiments of the present disclosure. The computing device 600 may include at least one processor 602 that executes instructions that are stored in a memory 604. The instructions may be, for example, instructions for implementing functionality described as being carried out by one or more components discussed above or instructions for implementing one or more of the methods described above. The processor 602 may access the memory 604 by way of a system bus 606. In addition to storing executable instructions, the memory 604 may also store data, images, information, event logs, and so forth.

The computing device 600 may additionally include a data store 608 that is accessible by the processor 602 by way of the system bus 606. The data store 608 may include executable instructions, data, images, information, event logs, etc. The computing device 600 may also include an input interface 610 that allows external devices to communicate with the computing device 600. For instance, the input interface 610 may be used to receive instructions from an external computer device, from a user, etc. The computing device 600 also may include an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 600 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for example, several devices may be in communication by way of a network connection and may collectively perform tasks described as being performed by the computing device 600.

Figure 7:
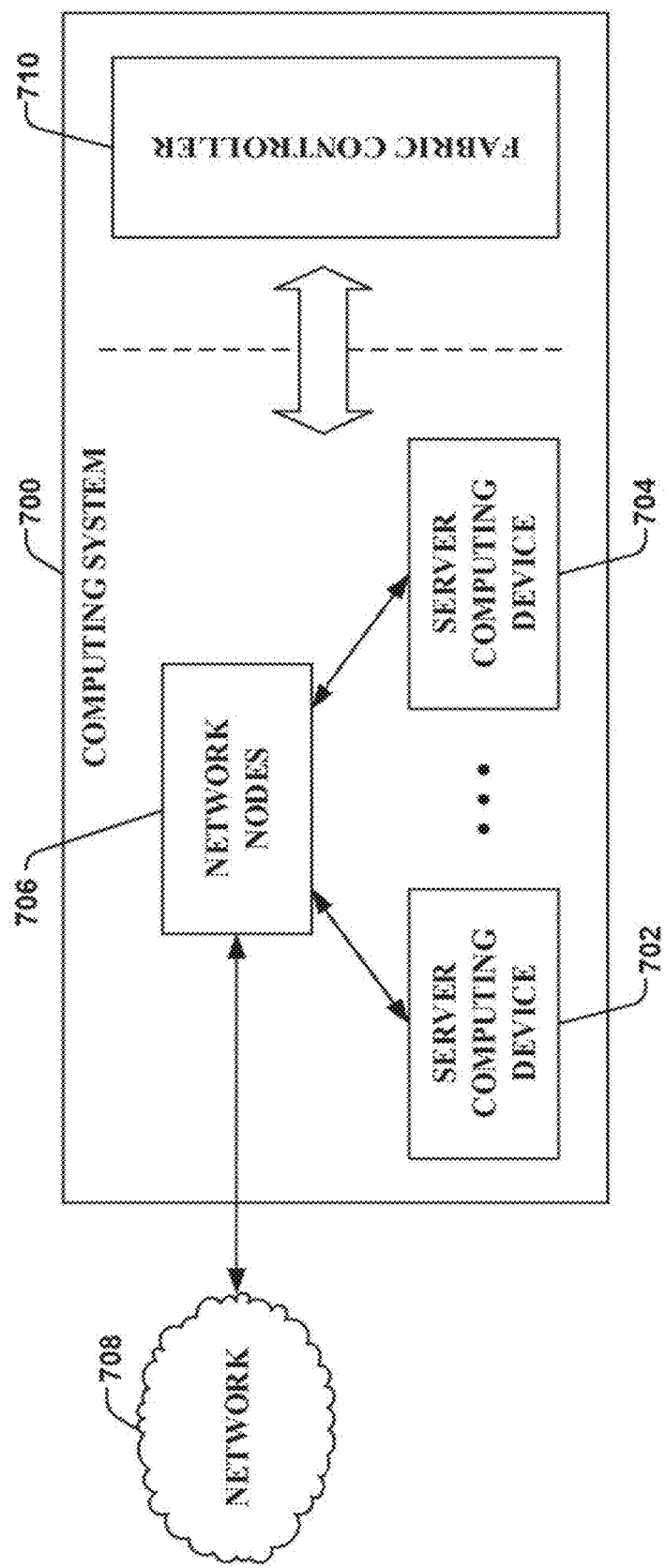
FIG. 7 depicts a high-level illustration of an exemplary computing system that may be used in accordance with the systems, methods, and computer-readable media disclosed herein, according to embodiments of the present disclosure.

Turning to FIG. 7, FIG. 7 depicts a high-level illustration of an exemplary computing system 700 that may be used in accordance with the systems, methods, and computer-readable media disclosed herein, according to embodiments of the present disclosure. For example, the computing system 700 may be or may include the imaging and/or video analysis system 102. Additionally, and/or alternatively, the imaging and/or video analysis system 102 may be or may include the computing system 700.

The computing system 700 may include a plurality of server computing devices, such as a server computing device 702 and a server computing device 704 (collectively referred to as server computing devices 702-704). The server computing device 702 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 702, at least a subset of the server computing devices 702-704 other than the server computing device 702 each may respectively include at least one processor and a memory. Moreover, at least a subset of the server computing devices 702-704 may include respective data stores.

Processor(s) of one or more of the server computing devices 702-704 may be or may include a processor of the imaging and/or video analysis system 102. Further, a memory (or memories) of one or more of the server computing devices 702-704 can be or include a memory of the imaging and/or video analysis system 702. Moreover, a data store (or data stores) of one or more of the server computing devices 702-704 may be or may include the data store of the imaging and/or video analysis system 102.

The computing system 700 may further include various network nodes 706 that transport data between the server computing devices 702-704. Moreover, the network nodes 706 may transport data from the server computing devices 702-704 to external nodes (e.g., external to the computing system 700) by way of a network 708. The network nodes 702 may also transport data to the server computing devices 702-704 from the external nodes by way of the network 708. The network 708, for example, may be the Internet, a cellular network, or the like. The network nodes 706 may include switches, routers, load balancers, and so forth.

A fabric controller 710 of the computing system 700 may manage hardware resources of the server computing devices 702-704 (e.g., processors, memories, data stores, etc. of the server computing devices 702-704). The fabric controller 710 may further manage the network nodes 706. Moreover, the fabric controller 710 may manage creation, provisioning, de-provisioning, and supervising of managed runtime environments instantiated upon the server computing devices 702-704.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improving markerless motion analysis, the method comprising:
receiving three-dimensional (3D) position data of reference landmarks fixed to a rigid body in a linked segment rigid body system captured by at least one camera, wherein the 3D position data is insufficient to construct 3D orientation information for at least one segment of the linked segment rigid body system, and the linked segment rigid body system includes two or more points on at least two directly or indirectly kinematically-constrained segments;
with probabilistic mapping, producing model equations for the 3D position data;

deriving, using the model equations, 3D kinematic data of—one or more segments of the linked segment rigid body system, wherein the deriving includes analyzing the two or more points on the at least two directly or indirectly kinematically-constrained segments to achieve dependent segment reference frames that make use of an additional constraint that complements detail provided by directly observable body-fixed points, and wherein the 3D kinematic data includes 3D orientation information for the at least one segment of the linked segment rigid body system; and providing the 3D kinematic data for display to evaluate motion performance.

2. The method according to claim 1,
wherein the at least one camera is a single camera, and wherein the method further comprises:
capturing, using a single camera, a first image and a second image of the linked segment rigid body system at a first time and a second time different from the first time.

3. The method according to claim 2, wherein the first image and the second image are captured using markerless motion capture.

4. The method according to claim 1, wherein receiving position data of the reference landmarks includes:
receiving, for at least two separate points in time, at least two key points of a first segment of the linked segment rigid body system and at least two key points of a second segment of the linked segment rigid body system, a key point corresponding to a position of a part of the linked segment rigid body system captured by the at least one camera.

5. The method according to claim 4, further comprising:
defining a first axis between the at least two key points of each segment;
defining a temporary axis mid-points of each of first axes, defined a second axis for each segment, orthogonal to the temporary axis and the respective first axis of each segment; and
defining a third axis for each segment orthogonal to the first axes and the second axes.

6. The method according to claim 5, further comprising:
generating three-dimensional angular kinematics for the first segment and the second segment based the at least two key points of the first segment, the at least two key points of the second segment from the at least two separate points in time and based on the defined first, second, and third axes of the key points.

7. The method according to claim 1, wherein producing the model equations includes using a neural network model, and wherein the method further comprises:
receiving a plurality of example datasets including a plurality of position data of joint centers of a body in motion; and
training the neural network model using the plurality of example datasets, the neural network model configured to output the model equations.

8. The method according to claim 7, further comprising:
constructing the neural network model, including a plurality of neurons, configured to output the model equations, the plurality of neurons arranged in a plurality of layers, including at least one hidden layer, and being connected by a plurality of connections.

9. The method according to claim 1, wherein deriving the 3D kinematic data using the model equations includes using the probabilistic mapping to enhance the 3D kinematic data.

10. A system for improving markerless motion analysis, the system including:
a data storage device that stores instructions for improving markerless motion analysis; and
a processor configured to execute the instructions to perform a method including:
receiving three-dimensional (3D) position data of reference landmarks fixed to a rigid body in a linked segment rigid body system captured by at least one camera, wherein the 3D position data is insufficient to construct 3D orientation information for at least one segment of the linked segment rigid body system, and the linked segment rigid body system includes two or more points on at least two directly or indirectly kinematically-constrained segments;
with probabilistic mapping, producing model equations for the 3D position data;
deriving, using the model equations, 3D kinematic data of—one or more segments of the linked segment rigid body system, wherein the deriving includes analyzing the two or more points on the at least two directly or indirectly kinematically-constrained segments to achieve dependent segment reference frames that make use of an additional constraint that complements detail provided by directly observable body-fixed points, and wherein the 3D kinematic data includes 3D orientation information for the at least one segment of the linked segment rigid body system; and
providing the 3D kinematic data for display to evaluate motion performance.

11. The system according to claim 10,
wherein the at least one camera is a single camera, and wherein the method further comprises:
capturing, using a single camera, a first image and a second image of the linked segment rigid body system at a first time and a second time different from the first time.

12. The system according to claim 11, wherein the first image and the second image are captured using markerless motion capture.

13. The system according to claim 10, wherein receiving position data of the reference landmarks includes:
receiving, for at least two separate points in time, at least two key points of a first segment of the linked segment rigid body system and at least two key points of a second segment of the linked segment rigid body system, a key point corresponding to a position of a part of linked segment rigid body system captured by the at least one camera.

14. The system according to claim 13, further comprising:
defining a first axis between the at least two key points of each segment;
defining a temporary axis mid-points of each of first axes, defined a second axis for each segment, orthogonal to the temporary axis and the respective first axis of each segment; and
defining a third axis for each segment orthogonal to the first axes and the second axes.

15. The system according to claim 14, further comprising:
generating three-dimensional angular kinematics for the first segment and the second segment based the at least two key points of the first segment, the at least two key points of the second segment from the at least two separate points in time and based on the defined first, second, and third axes of the key points.

16. The system according to claim 10, wherein producing, the model equations, includes using a neural network model, and
wherein the method further comprises:
receiving a plurality of example datasets including a plurality of position data of joint centers of a body in motion; and
training the neural network model using the plurality of example datasets, the neural network model configured to output the model equations.

17. The system according to claim 16, further comprising:
constructing the neural network model, including a plurality of neurons, configured to output the model equations, the plurality of neurons arranged in a plurality of layers, including at least one hidden layer, and being connected by a plurality of connections.

18. The system according to claim 10, wherein deriving the 3D kinematic data using the model equations includes using the probabilistic mapping to enhance the 3D kinematic data.

19. A non-transitory computer-readable storage device storing instructions that, when executed by a computer, cause the computer to perform a method for improving markerless motion analysis, the method including:
receiving three-dimensional (3D) position data of reference landmarks fixed to a rigid body in a linked segment rigid body system captured by at least one camera, wherein the 3D position data is insufficient to construct 3D orientation information for at least one segment of the linked segment rigid body system, and the linked segment rigid body system includes two or more points on at least two directly or indirectly kinematically-constrained segments;
with probabilistic mapping, producing model equations for the 3D position data;
deriving, using the model equations, 3D kinematic data of—one or more segments of the linked segment rigid body system, wherein the deriving includes analyzing the two or more points on the at least two directly or indirectly kinematically-constrained segments to achieve dependent segment reference frames that make use of an additional constraint that complements detail provided by directly observable body-fixed points, and wherein the 3D kinematic data includes 3D orientation information for the at least one segment of the linked segment rigid body system; and
providing the enhanced 3D kinematic data for display to evaluate motion performance.

20. The computer-readable storage device according to claim 19, wherein the at least one camera is a single camera, wherein the method further comprises:
capturing, using a single camera, a first image and a second image of the linked segment rigid body system at a first time and a second time different from the first time, and
wherein the first image and the second image are captured using markerless motion capture.

* * * * *